March 31, 1931.  W. A. PIPKIN  1,798,555
METHOD OF EXTRACTING THE OILY MATERIALS
FROM THE PEELS OF CITRUS FRUITS
Filed Feb. 26, 1930
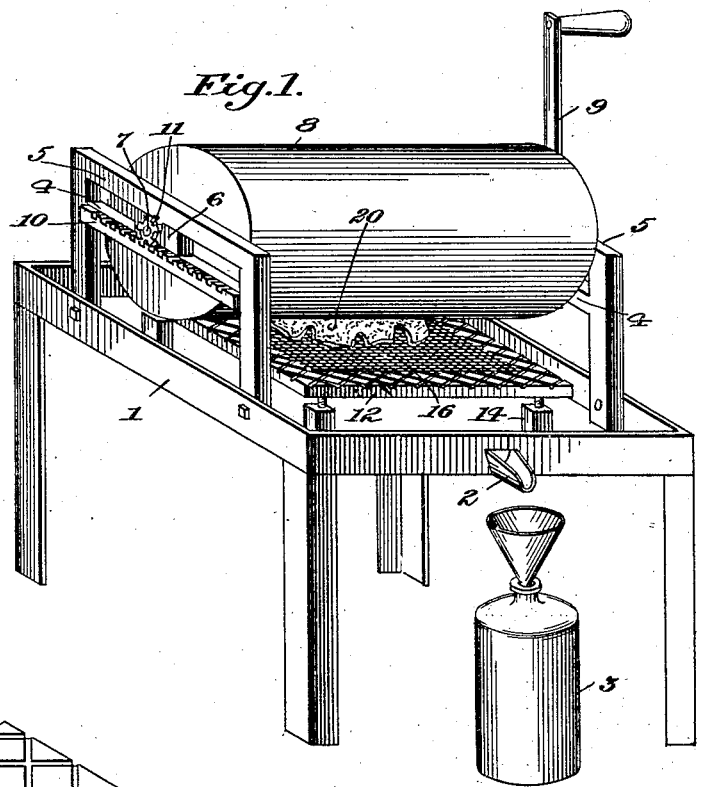
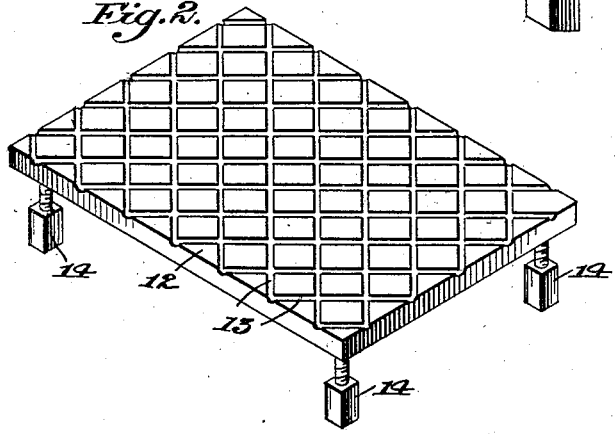
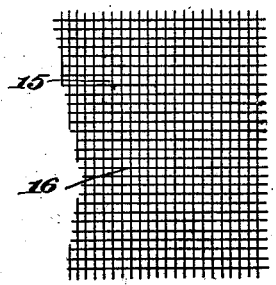
Inventor:
Wilbur A. Pipkin,
by Joseph W. Harris
Att'y.

Patented Mar. 31, 1931

1,798,555

UNITED STATES PATENT OFFICE

WILBUR A. PIPKIN, OF SAFETY HARBOR, FLORIDA

METHOD OF EXTRACTING THE OILY MATERIALS FROM THE PEELS OF CITRUS FRUITS

Application filed February 26, 1930. Serial No. 431,506.

This invention relates to the extraction of the oily materials from the peels of citrus fruits, for example, from orange and lemon peels, etc.

An object of the invention is to provide an improved process for treating citrus peels, for extracting the oily material therefrom in its natural state, and of a superior quality.

A further object of the invention is to recover the oily material from the citrus peels at a lower cost, and by a method which does not contaminate the product with fibres from the peel.

Other objects of the invention will be apparent to those skilled in the art upon reading the specification.

Heretofore, the production of citrus peel oil commercially known as "hand-pressed" oil, from orange peel and lemon peel, was confined to four general methods:—

First, hand-pressing, which consists in carefully peeling the citrus fruit, reversing the curvature of the peel, applying a sponge to the concave oil-bearing skin side, and dexterously kneading, pressing, and crimping the peel, so as to rupture the oil cells; the sponge absorbs the free oil, and is used to wipe off any adhering drops.

Second, displacement, which consists in lightly rolling the whole citrus fruit over a nest of closely set needles, thereby puncturing the individual oil cells and expelling the oil therefrom, which flows down the needles.

Third, high pressure on grated citrus peel, which consists in grating the top skin containing the oil cells off the whole fruit and subjecting the finely grated mass of oil cells, fibre, and skin, to a very high continuous pressure in a separate suitable machine.

Fourth, juice method, which consists in passing the whole citrus fruit through a series of grinding and squeezing rolls that break and tear the oil cells, thereby releasing the oil which is washed out by the juice; the liquid product being run through a centrifuge by which the oil is separated.

The present process differs from the processes heretofore used in that the citrus peel is placed upon a suitable foraminous surface, the openings through which are such a size and sufficiently close together so that the peel with its outer yellow skin upon the foraminous surface will be properly supported thereby, and withstand the application of an oil-cell bursting pressure applied to the inner white surface of the peel to burst the oil cells within the outer yellow layer of the peel and expel the oil therefrom, and permit the expelled oil to flow through the openings in the foraminous surface, and yet not allow the thin outer yellow skin of the peel to be cut or broken in any way, except where the oil cells have been ruptured by the pressure. If the foraminous surface has large openings, or the pressure applied is great enough to cut or break the outer yellow skin of the peel, the principle of the process of extracting the oil would still be the same as with a surface having smaller openings; but the preferred procedure is to burst the oil cells but avoid breaking the outer yellow skin, as described in detail herein. The oils obtained, as far as concerns their flavors and odors, are the true oils of the citrus peel, and are the best oils obtainable; being of a quality essentially similar to the grade of peel oils known as "hand pressed," and superior to the oils obtained by the generally practiced four methods above described.

In the accompanying drawings—

Fig. 1 is a view in perspective of one type of apparatus that may be used to practice the invention;

Fig. 2 is a view in perspective of a suitable grooved pressing table or plate; and Fig. 3 is a view of a suitable foraminous body, for example, a wire screen.

In Fig. 1, a pan-top table 1, which may be slightly inclined, is provided with an outlet pipe 2 to drain the collected oil into a suitable receiver 3. Suitably supported separated guides 4—4 provide channels 5—5 in which travel bearing blocks 6, the bearing blocks supporting a shaft 7 upon which is mounted a pressure roll 8, and to one end of the shaft 7 is secured a handle 9 by which the roll 8 may be operated. Upon each of the lower bars 4 is mounted a rack 10 which meshes with a pinion 11 on each end of the shaft 7.

Within the pan-top 1 is adjustably supported a grooved pressing table or plate 12 which has an otherwise smooth polished surface and is preferably made of a stout metal casting which will resist pressure, and is preferably made of a metal which will not be corroded by, and will not contaminate the citrus oil collected; the pressing table may be nickel plated to increase its resistance to corrosion, and to reduce contamination of the product. The pressure table 12 is provided with grooved ducts or channels 13 which serve to collect the oil pressed from the citrus peel, and discharge the oil into the pan-top. The pressure table 12 is also provided with adjustable feet 14, for example screw threaded blocks, by which the degree of pressure to be exerted by the roll upon the peel during the operation may be controlled. Upon the surface of the pressure table 12 is placed a sheet of foraminous metal 15, which may be a piece of wire screen 16 of about 28 to 30 mesh, or of a perforated metal sheet containing holes of about the same size and as numerous as in the wire screen. I have found that wire screen cloth of 28 to 30 mesh is very satisfactory in the operation of this process, the oil obtained is clean and free from fibres, and the peel is not cut; but I may use a screen cloth or perforated sheet metal plate having perforations of a larger or smaller size than 28 or 30 mesh.

To practice the improved process, the pressing table 12 is placed in the pan-top 1, and the feet 14 of the pressure table adjusted to give the desired pressure upon the peel to be treated. The screen cloth 16 is now placed upon the table 12, and citrus peel 20, for example orange peel, placed upon the screen 16 with the yellow skin portion in contact with the screen, the feet 14 finally adjusted if necessary, and the handle 9 of the roll 8 turned, thereby advancing the roll over the orange peel and pressing the peel firmly against the screen 16. The oil cells in the yellow surface of the peel are burst by the applied pressure without cutting or shredding the peel, and the oil in the cells thereby expelled flows through the meshes of the screen 16 into the grooves 13 of the pressure table, from which it flows into the pan-top and is collected therefrom. The application of the rolling pressure to the peel may be repeated if necessary. After the oil has been extracted, the peel residue is removed and fresh peel placed on the apparatus.

The invention is not limited to the type of apparatus illustrated herewith, nor to the application of a rolling pressure to the peel, the pressure may be applied by any suitable pressure device, for example a press, but the process should be practiced in a manner that will burst the oil cells and expel the oil therefrom, without contaminating the expelled oil with other matter from the peel.

I claim:
1. The method of extracting the oily material from the oil-bearing cells in citrus fruit peel, which comprises supporting the oil-bearing surface of said peel upon a foraminous surface, applying a cell-bursting pressure against the reverse side of said peel, and expelling the oil from said oil-bearing cells into the meshes of said foraminous surface, and finally collecting the oil.

2. The method of extracting the oily material from the oil-bearing cells in citrus fruit peel, which comprises supporting the oil-bearing surface of said peel upon a foraminous surface, applying a pre-determined pressure against the reverse side of said peel to burst the oil cells and expel the oil therefrom into the meshes of said foraminous surface, and repeating the application of pressure to said peel, and finally collecting the oil.

3. The method of extracting the oily material from the oil-bearng cells in citrus fruit peel, which comprises supporting the oil-bearing surface of said peel upon a foraminous surface the perforations in which are from 28 to 30 mesh, applying a pre-determined pressure against the reverse side of said peel to burst the oil cells and expel the oil therefrom into the meshes of said foraminous surface, and finally collecting the oil.

4. The method of extracting the oily material from the oil-bearing cells in citrus fruit, which comprises supporting the oil-bearing surface of said peel upon a foraminous surface, applying a rolling pressure to the reverse sde of said peel to progressively burst the oil cells in said peel and expel the oil therefrom into meshes of said foraminous surface, and finally collecting the oil.

5. The method of extracting the oily material from the oil-bearing cells in citrus fruit peel, which comprises supporting the oil-bearing surface of said peel upon a foraminous surface the perforations in which are from 28 to 30 mesh, applying a rolling pressure to the reverse side of said peel to progressively burst the oil cells in said peel and expel the oil therefrom into the meshes of said foraminous surface, and finally collecting the oil.

6. The method of extracting the oily material from the oil-bearing cells in citrus fruit peel, which comprises supporting the oil-bearing surface of said peel upon a foraminous surface the perforations in which are from 28 to 30 mesh, applying a pre-determined rolling pressure to the reverse side of said peel to progressively burst the oil cells in said peel and expel the oil therefrom into the meshes of said foraminous surface, and finally collecting the oil.

In testimony whereof I hereby affix my signature.

WILBUR A. PIPKIN.